(12) United States Patent
Cooper

(10) Patent No.: US 6,507,016 B1
(45) Date of Patent: Jan. 14, 2003

(54) APPARATUS AND METHOD FOR SENSING A VEHICLE ROLLOVER CONDITION

(75) Inventor: Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/551,801

(22) Filed: Apr. 18, 2000

(51) Int. Cl.⁷ .............................. G01P 5/06; G01P 15/03
(52) U.S. Cl. ................................ 250/231.1; 73/862.23; 180/282; 340/440
(58) Field of Search ...................... 250/216, 227.11, 250/227.14, 231.13, 231.14, 231.1, 231.15, 231.16, 231.17, 231.18, 237 G; 341/14; 73/862.23, 862.26; 180/282; 340/440

(56) References Cited

U.S. PATENT DOCUMENTS

| | | |
|---|---|---|
| 4,207,463 A | 6/1980 | Iyeta |
| 4,247,769 A | 1/1981 | Warner |
| 4,320,293 A | 3/1982 | Guretzky |
| 4,338,517 A | 7/1982 | Perrine |
| 4,497,118 A | 2/1985 | Byrum |
| 4,554,450 A | 11/1985 | Goepel |
| 4,584,778 A | 4/1986 | Komasaku et al. |
| 4,587,513 A | 5/1986 | Burrowes et al. |
| 4,650,995 A | 3/1987 | Tokunaga et al. |
| 4,651,128 A | 3/1987 | Kolb |
| 4,664,519 A | 5/1987 | Hullein et al. |
| 4,683,375 A | 7/1987 | Hoshino et al. |
| 4,716,534 A | 12/1987 | Baucom et al. |
| 4,728,788 A | 3/1988 | Myers et al. |
| 4,798,087 A | 1/1989 | Takeda et al. |
| 4,922,620 A | 5/1990 | Terragni |
| 4,931,635 A | 6/1990 | Toyama |
| 5,103,090 A | 4/1992 | Weiner et al. |
| 5,120,706 A | 6/1992 | Weeks, II |
| 5,329,121 A | 7/1994 | Leviton |
| 5,392,112 A | 2/1995 | Nakamura |
| 5,483,050 A | 1/1996 | Fukasawa |
| 5,613,571 A | 3/1997 | Rank et al. |
| 5,670,780 A | 9/1997 | Lewis |
| 5,825,284 A | 10/1998 | Dunwoody et al. |
| 5,890,084 A | 3/1999 | Halasz et al. |
| 6,204,499 B1 * | 3/2001 | Schaefer ................ 250/227.14 |

* cited by examiner

Primary Examiner—Stephone B. Allen
(74) Attorney, Agent, or Firm—Tarolli, Sundheim, Covell, Tummino & Szabo L.L.P.

(57) ABSTRACT

A vehicle rollover sensor (10) includes a rotor (12) having a central rotor axis (14) and which is mountable within a vehicle (18). The rotor (12) is inertially balanced and freely rotatable about the rotor axis (14). The sensor (10) also includes a detector (32) for detecting rotation of the rotor (12) relative to the rotor axis (14). The detector (32) is operative to provide a detector signal (43) indicative of the detected relative rotation. The detector signal (43) is used to determine the occurrence of a vehicle rollover condition.

20 Claims, 2 Drawing Sheets

APPARATUS AND METHOD FOR SENSING A VEHICLE ROLLOVER CONDITION

TECHNICAL FIELD

The present invention relates to an apparatus and method for sensing a condition of a vehicle. More Particularly the present invention relates to an apparatus and method for sensing a parameter indicative of a vehicle rollover condition.

BACKGROUND OF THE INVENTION

In order to detect a vehicle rollover, the vehicle may be equipped with a sensor for detecting the occurrence of a vehicle rollover condition. The sensor typically is connected to a controller that controls actuation of one or more actuatable devices, such as an occupant restraint and/or an active suspension system, in response to a sensed rollover condition.

For example, U.S. Pat. No. 5,825,284 discloses a vehicle system having a sensor that provides a signal indicative of lateral acceleration of the vehicle. A processor calculates a roll moment based on the sensor signal, which is visually displayed as an indication of the likelihood of a vehicle rollover condition.

Various devices also have been proposed for detecting an angular orientation of an object. For example, U.S. Pat. No. 5,329,121 to Leviton, U.S. Pat. No. 4,207,463 to Iyeta, U.S. Pat. No. 5,670,780 to Lewis, U.S. Pat. No. 5,103,090 to Weiner et al., and U.S. Pat. No. 4,320,293 to Guretzky each discloses a rotation angle measuring device that senses rotation of a body using optical emitters and detectors.

SUMMARY OF THE INVENTION

A first exemplary embodiment of the present invention provides a vehicle rollover sensor that includes a rotor having a rotor axis and which is mountable within the vehicle. The rotor is inertially balanced and freely rotatable about the rotor axis. The sensor also includes a detector for detecting rotation of the rotor relative to the rotor axis. The detector is operative to provide a detector signal indicative of the detected rotation. The detector signal is used to determine the occurrence of a vehicle rollover condition.

Another exemplary embodiment of the present invention provides a vehicle rollover sensor that includes a detector for detecting a parameter indicative of vehicle rollover condition and for providing a first signal indicative thereof. The vehicle rollover sensor also includes means for removing a time-averaged portion of the detected parameter from the first signal and for providing a second signal indicative of the remaining portion of the detected parameter. The second signal has a characteristic indicative of a vehicle rollover condition.

BRIEF DESCRIPTION OF THE DRAWINGS

The foregoing and other features and advantages of the invention will become more apparent to one skilled in the art upon consideration of the following description of the invention and the accompanying drawings in which.

DESCRIPTION OF THE EMBODIMENTS

Figure 1:
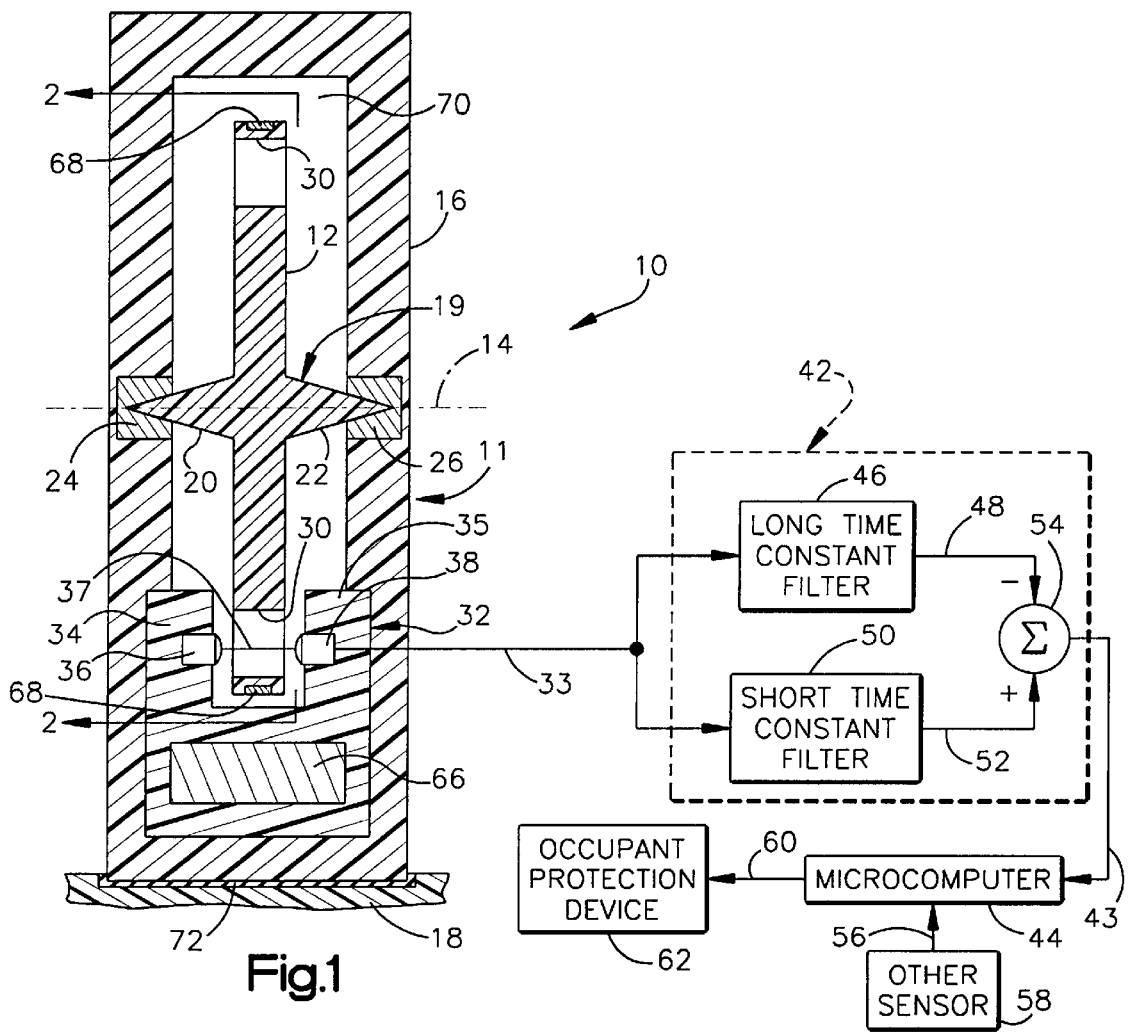
FIG. 1 is a schematic diagram, partially in section, of a vehicle rollover sensor system in accordance with one exemplary embodiment of the present invention.

FIG. 1 illustrates a vehicle occupant protection system 10 having a rollover sensor assembly 11 in accordance with the present invention. The sensor assembly 11 includes an inertially balanced rotor 12 having a central rotor axis 14. The rotor 12 is rotatably mounted within a housing 16 so as to be freely rotatable about the rotor axis 14. The housing 16 is mounted in a vehicle, indicated schematically at 18. Preferably, the housing 16 is mounted so that the rotor axis 14 is aligned with the direction of travel and the front-to-rear longitudinal axis of the vehicle 18.

The rotor 12 includes a rotor axle 19 which rotatably supports the rotor 12 in housing 16 to provide for free relative rotation between the housing 16 and the rotor 12. The rotor axle 19, for example, is formed of a pair of elongated conical supports 20 and 22 which extend longitudinally from the center of opposite sides of the rotor 12. The supports 20 and 22 extend from the center of the rotor 12 coaxially with the rotor axis 14. The rotor axle 19 may be integrally formed as part of the rotor 12 or, alternatively, may be attached thereto in an appropriate manner.

The housing 16 includes low friction bearings 24 and 26 which receive corresponding end portions of the conical supports 20 and 22, respectively, in commensurate conical receptacles formed in bearings 24, 26. Preferably, the bearings 24 and 26 do not transmit any significant torque, such as due to frictional forces, between the bearings 24 and 26 and the rotor supports 20 and 22 during relative rotation between rotor 12 and housing 16. To provide a desired low friction relative rotation, for example, the bearings 24 and 26 could be formed of a polished metal and the respective supports 20, 22 formed of a smoothed Teflon or plastic material.

Preferably, the rotor 12 is inertially balanced about the axis 14 and, as mentioned, substantially no friction is transmitted between the bearings 24 and 26 and the supports 20 and 22. Accordingly, the rotor's 12 own inertia maintains it at a substantially fixed orientation (relative to an earth reference location) as the housing 16 rotates relative to the rotor 12 about the rotor axis 14, such as during a vehicle rollover condition. The housing 16 rotates relative to rotor 12 commensurate with angular rotation of the vehicle 18 in which the rollover sensor assembly 11 is mounted.

Figure 2:
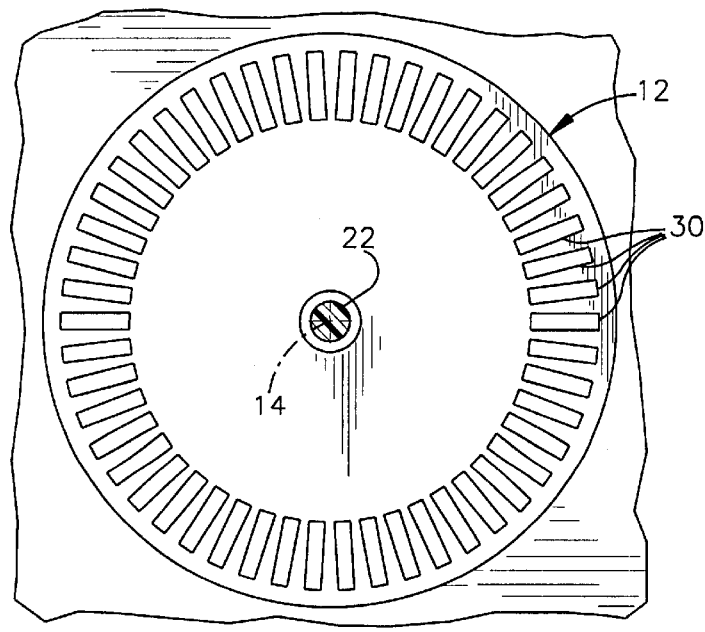
FIG. 2 is a side elevation of part of the system of FIG. 1 taken along line 2—2.

In FIGS. 1 and 2, for example, the rotor 12 is an annular disk having a plurality of radially extending slots or slits 30 formed axially through the rotor 12. The slits 30 radially extend toward and are positioned adjacent to the outer perimeter of the rotor 12. The slits 30 permit signals within a portion of the electromagnetic spectrum, such as visible or infrared light, to be transmitted through the openings of the rotor while the solid and/or opaque portions of the rotor 12 intermediate adjacent slits 30 block such signals. The number and spacing of the slits 30 define the resolution of the rollover sensor assembly 11. The resolution is determinative of the sensitivity of the vehicle rollover sensor 11. One of the functions of the rollover sensor assembly 11 is to permit a determination of the rollover rate. The higher the resolution, the more accurate the rollover rate determination will be.

As an alternative to the slits 30, the rotor 12 may include other indicia or structure to provide a signal indicative of relative rotation between the rotor 12 and the housing 16. The particular configuration of the rotor 12 depends on the type of signal transmitters and receivers being used. The rotor remains substantially inertially balanced about the axis 14 during relative rotation. When electromagnetic signals, such as infrared or visible light, are used, the rotor 12 alternatively could be formed of an annular disc having alternating axially opaque and axially transparent radially extending portions located concentrically about the rotor axis 14. Another alternative is to use a rotor 12 having radially extending reflective strips or lines located on one side of a dark, light-absorbing surface of the rotor.

Referring back to the exemplary embodiment of FIG. 1, the sensor assembly 11 also includes a detector 32 located within the housing 16 for detecting a parameter indicative of vehicle rollover. In particular, the detector 32 detects relative rotation between the rotor 12 and the housing 16. Recall that the housing 16 is fixed relative to the vehicle 18. If the vehicle 18 should rollover, the housing 16 rolls with the vehicle. The detector assembly 32 provides an output signal 33 indicative of the detected relative rotation between the housing 16 and rotor 12. In particular, light pulses received at the detector 32 provide an indication of the rate of relative rotation between the housing 16 and the rotor 12. The output signal 33, in turn, provides an indication of the rate of relative rotation in response to the received light pulses.

The detector 32 is mounted to the housing 16 spaced radially apart from the rotor axis 14 and positioned adjacent the perimeter of the rotor 12. The detector 32, for example, is formed of a generally C-shaped bracket having a pair of axially spaced apart and opposed legs 34 and 35. The legs 34 and 35 are located on opposite axial sides of the housing 16 so that a radially outer portion of the rotor 12 pass between the legs 34 and 35.

The detector assembly 32 includes an optical emitter 36, such as a light emitting diode (LED) or other light source which emits a light signal, such as a beam of light indicated at 37. The emitter 36 emits the light beam 37 in an axial direction toward the rotor 12. The emitter 32 is supported by the leg 34, although it alternatively could be attached to the housing 16. The light beam 37 is received by an optical receiver 38 in dependence upon the relative orientation between the rotor 12 and the housing 16.

The optical receiver 38 is axially spaced apart from the emitter 36 and supported by the leg 35. The optical receiver 38, for example, is a photodetector or photodiode responsive to at least the wavelength of light 37 emitted by the emitter 36. When the receiver 38 receives light 37 from the emitter 36, the receiver provides the detector signal 33 having an electrical characteristic indicative of the detected light. The light received by the receiver 38 varies as a function of the relative orientation between the housing 16 and the rotor 12 and, in turn, provides an indication of a vehicle rollover condition.

As the housing 16 rotates relative to the rotor 12, the slotted rotor 12 forms an optical interrupter/parser which results in a series of light pulses which are detected by the receiver 38 during relative rotation between the housing 16 and rotor 12 as occurs during a rollover event. Specifically, when the housing 16 rotates relative to the rotor 12, the slits 30 pass between the optical emitter 36 and the receiver 38 so as to permit the passage of light 37 through then aligned slits. The receiver 38 generates the detector signal 33 consisting of a series of pulses commensurate with detected pulses of light. The detected pulses of light provide an indication of the occurrence of relative rotation between the housing 16 and the rotor 12. From these detected pulses, the rate of rotation can be determined. For example, the rate of rotation may be determined based on the length of time between adjacent rising and falling edges of the detector output signal 33. Advantageously, the rate of relative rotation does not depend on the relative angular orientation of the rotor about the rotor axis 14.

The rotor 12 remains substantially stationary during roll events because, ideally, no rotational force is transmitted between the rotor and the housing 16 due to the substantially frictionless mounting arrangement therebetween and because the rotor is inertially balanced about the rotor axis 14. In practice, however, the rotor 12 typically experiences a small amount of initial rotation about the axis 14. The initial rotation of the rotor 12, for example, may be due to the small amount of friction that is present between the bearings 24, 26 and rotor supports 20, 22 as well as vibration of the system 10.

The rate of initial relative rotation between the housing 16 and the rotor 12, when averaged over time, is substantially small when compared with the rate of relative rotation that occurs during a vehicle rollover condition. Accordingly, the initial rotation rate of the rotor 12 can be treated as being approximately constant or as a time-averaged relative rate of rotation.

The light pulses detected by the receiver 38 and, in turn, the detector output signal 33 include a parameter indicative of any existing initial relative rotation between the housing 16 and the rotor 12 at the onset of a vehicle rollover condition, such as due to the small initial friction forces. Specifically, this parameter is indicative of the initial rate of relative rotation between the housing 16 and the rotor 12. In order to remove the portion of the detector signal 33 having the parameter indicative of the initial relative rotation rate, the receiver 38 of the detector 32 is electrically connected with a filter circuit 42.

The filter circuit 42 receives the detector output signal 33 from the receiver 38 and removes a portion of the detector signal 33 corresponding to the time-averaged relative rate of rotation between the housing 16 and the rotor 12. The filter circuit 42 provides a rollover signal 43 indicative of an instantaneous rate of relative rotation between the housing 16 and the rotor 12. The rollover signal 43 also indicates the occurrence of a vehicle rollover condition.

By way of example, the filter circuit 42 includes a first filter 46, such as a long time constant or averaging filter. The filter 46 is a low pass filter with a relatively low corner frequency and long time constant. The filter 46 passes a time-averaged, low frequency component of the detector signal 33. The filter 46 also preferably smoothes the detector signal 33, removing noise and other unwanted frequency components not indicative of a vehicle rollover condition. The filter 46 provides an output signal 48 having a characteristic indicative of a low frequency component of the detector signal 33 that has been averaged over time. The signal 48, thus, corresponds to the part of the detector signal 33 indicative of initial relative rotation between the housing 16 and rotor 12.

The filter circuit 42 preferably also includes a second filter 50 connected in parallel with the filter 46. The second filter 50 has a substantially shorter time constant than the time constant of the filter 46. The second filter 50, for example, is a low pass filter that provides an output signal 52 having a characteristic indicative of a more rapidly varying or substantially instantaneous value of the detector signal 33. The output signal 52 also correlates to the relative rate of rotation between the rotor 12 and the housing 16, although it also includes a component indicative of the initial relative rotation.

A summer function 54 subtracts the time-averaged filtered signal 48 from filtered signal 52 to provide the rollover signal 43. The rollover signal 43 has a characteristic indicative to of an instantaneous rate of relative rotation between the housing 16 and the rotor 12. The time-averaged component of the rate of relative rotation has been isolated by the filter 46 and removed from a substantially instantaneous indication of the rotation rate by the summer function 54. The time-averaged signal 48 alternatively could be subtracted directly from the detector signal 33 to provide the rollover signal 43.

The filter circuit 42 is electrically connected with a controller, such as a microcomputer 44. The microcomputer 44 receives the rollover signal 43 and is programmed for determining whether a vehicle rollover condition exists. The microcomputer 44 may, for example, be formed of a microprocessor-based system, a plurality of discrete components, one or more integrated circuits, or an application specific integrated circuit (ASIC). The filter circuit 42 also could be part of the microcomputer 44, for example, being implemented as a digital filter in appropriate software stored in the microcomputer.

The microcomputer 44 also receives an input signal 56 from one or more other sensors 58. Such other sensors may include, for example, an acceleration sensing device (e.g., an accelerometer), an impact sensing device, a vehicle roll switch, or another crash sensing device which may provide a signal useful in determining the occurrence of a vehicle crash event. The microcomputer 44 processes the signals 43 and 56 to determine whether a vehicle crash event exists, including a vehicle rollover condition.

Specifically, the microcomputer 44 determines the occurrence of a vehicle crash event, namely a vehicle rollover condition, when the signal 43 indicates an instantaneous rotation rate that exceeds a predetermined threshold value. The threshold value is determined from empirical testing for a particular vehicle platform. Upon determining the occurrence of a vehicle crash event, the microcomputer 44 provides an output signal 60 to control actuation of one or more actuatable occupant protection device(s) 62.

By way of example, the occupant protection device(s) 62 may include a seat belt pretensioning device, an actuatable vehicle roll bar, an actuatable head restraint, an active vehicle suspension system and/or any other actuatable protection device that may either help prevent a vehicle rollover from occurring or help protect a vehicle occupant during a vehicle rollover. Based on the rollover signal 43 and the sensor signal(s) 56, the microcomputer 44 also determines which actuatable occupant protection device(s) 62 should be actuated as well as their sequence of actuation.

The system 10 also may include damping means to help reduce the initial relative rotation of the rotor 12. The damping means may include, for example, a magnetic field generating device 66, such as a permanent magnet, positioned adjacent to the rotor 12. The magnetic field provided by the field generating device 66 operates on the rotor 12 to prevent or limit the amount of initial rotation. This is accomplished, for example, by forming the rotor 12 of a magnetizable material. Alternatively, the rotor 12 could include a continuous annular ring or strip 68 of a magnetizable material positioned along its perimeter. In this way, the magnetic field from the field generating device 66 imposes a drag or damps at least some of the initial relative rotation of the rotor 12.

Another approach to reduce the initial relative rotation of the rotor 12 is to fill a space 70 enclosed by the housing 16 with a suitable viscous fluid that engages the rotor. The fluid would in turn inhibit initial rotation of the rotor 12 relative to the housing 16. The viscosity of such fluid, however, is selected so that the more rapid rotation of the rotor relative to the housing, such as due a vehicle rollover condition, is permitted.

Yet another approach to reduce the initial relative rotation is to provide a plurality of wings, similar to fan blades (not shown), which extend axially from a surface of the rotor 12. The wings would increase the surface area of the rotor 12 and, in turn, create additional resistance to slow rotation rates to reduce the initial rotation of the rotor. Such wings also could be used when the interstitial space 70 is filled with fluid.

Vibration of the housing 16 further may be minimized by interposing a damping plate 72 between the housing and the part of the vehicle 18 to which it is mounted. The damping plate 72, for example, is formed of a soft, flexible material, such as rubber or plastic.

Figure 3:
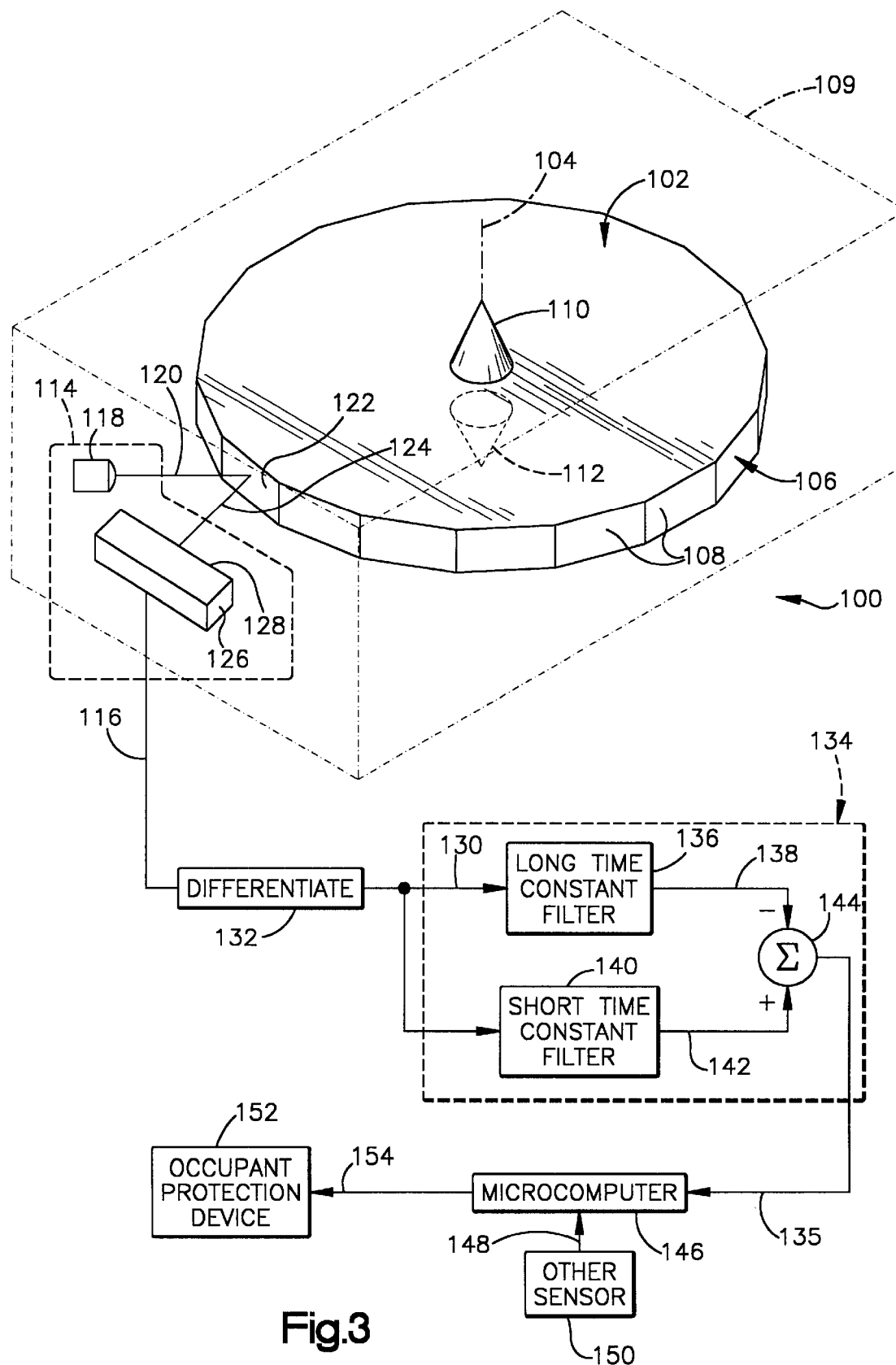
FIG. 3 is a schematic diagram of a vehicle rollover sensor system in accordance with another exemplary embodiment of the present invention.

FIG. 3 illustrates another embodiment of a vehicle rollover sensor system 100 in accordance with the present invention. The system 100, like the system 10 of FIG. 1, includes an annular rotor 102 having a central rotor axis 104. The rotor 102 is inertially balanced about the rotor axis 104.

The rotor 102 has a cylindrical sidewall portion 106 having a plurality of circumferential facets 108. Each of the facets 108 is formed of a reflective material. The rotor 102 is rotatably mounted within a housing, illustrated schematically at 109, by bearings (not shown), which are substantially identical to that shown and described with respect to FIG. 1. The mounting arrangements enables the rotor 102 to be substantially freely rotatable about the rotor axis 104.

The rotor axis 104 is fixed relative to the housing 109, which is fixed relative to a vehicle (not shown). A pair of coaxial conical supports 110 and 112, for example, extend outwardly from opposite central surfaces of the rotor 102 to form a rotor axle. The rotor axle may be integrally formed as part of the rotor body or, alternatively, it may be attached thereto in an appropriate manner. The bearings, which are fixed to the housing 109, support end portions of the cones 110 and 112 to permit substantially free relative rotation between the rotor 102 and the rotor axis 104, as described above.

A detector 114, which is fixed relative to the housing 109, detects relative rotation between the rotor 102 and the housing. The detector 114 provides a signal 116 having a characteristic indicative of relative rotation between the rotor 102 and the housing 109.

In this embodiment, the detector 114 is positioned within the housing 109 adjacent the rotor 102. The detector 114 includes an optical emitter 118 that emits a beam of light, indicated at 120, that strikes the faceted sidewall 106 of the rotor 102. This causes the light beam 120 to be reflected off the surface of an adjacent facet 122 as a reflected light beam 124.

The reflected light beam 124 is received by an optical receiver 126, such as a position sensitive detector (PSD). The PSD 126, for example, has a light receiving surface 128 formed of a substantially linear array of many photodiodes having a very small pixel size. The reflected light beam 124 produces a spot on the surface 128 of the PSD 126, which is detected by a pixel thereof. As the rotor 102 rotates relative to the housing 109 about the axis 104, the adjacent facet 122 also rotates, resulting in the reflected spot of light sweeping across the surface 128 commensurate with the relative rotation between the rotor and the housing. The PSD 126 provides an output signal 116 having an electrical characteristic indicative of the position at which the spot of light from the reflected light beam 124 strikes the surface 128.

As the rotor 102 rotates relative to detector 114, the detected position of the reflected light beam 124 varies continually as a function of the relative rotation between the rotor and the detector. This results in the position signal 116 providing a high resolution of the relative orientation between the housing 109 and the rotor 102. The resolution is determined by the size of the spot of reflected light 124 and the number of pixels which form the PSD 126. Accordingly, the system 100 is capable of detecting small variations in the relative rotation between the rotor 102 and the housing 109. The signal 116, thus, provides a corresponding high resolution of the detected relative rotation. This configuration enables the system 100 to measure much slower rotation rates of the rotor 102.

The rate of change of the signal 116 is proportional to the rate of relative rotation between the rotor 102 and the housing 109 about the rotor axis 104. The signal 116 is differentiated by a differentiator circuit 132. The differentiator 132 may be formed of analog or digital circuitry configured to differentiate the signal 116 as is known in the art. If the differentiator 132 is a digital circuit, a suitable analog-to-digital converter (not shown) is used to convert the analog signal 116 into a digital signal indicative of the position of the reflected light beam 124. The differentiator 132 provides the signal 130 having a characteristic indicative of the rate of change of the signal 116, which is proportional to the rate of relative rotation between the rotor 102 and the housing 109. The signal 130, however, includes a portion that is indicative of an initial relative rate of rotation between the rotor 102 and the housing 109.

As stated above, such initial relative rotation may be present at the onset of a vehicle rollover condition and, if not removed, could result in improper determination of a vehicle rollover condition. The differentiated signal 116 is, therefore, provided to a filter circuit 134. The filter circuit 134 is configured to smooth the signal 130 as well as to remove a time-averaged portion of the signal indicative of the initial relative rotation of the rotor 102. The filter circuit 134 provides a rollover signal 135 having a characteristic indicative of a vehicle rollover condition. In particular, the rollover signal 135 is indicative of an instantaneous or dynamic rate of relative rotation between the rotor 102 and the housing 109.

The filter circuit 134 is substantially identical to the filter circuit 42 of FIG. 1. The filter circuit 134 includes a long-time constant or averaging filter 136, such as a low pass filter having a long time constant. The filter 136 passes a time-averaged, low frequency component of the signal 130. The filter 136 provides an output signal 138 having a characteristic indicative of the rate of relative rotation between the rotor 102 and the housing 109 which has been averaged over time.

The output signal 130 also is filtered by a short-time constant filter 140 connected in parallel with the filter 136. The filter 140, for example, is a low pass filter having a substantially shorter time constant than the filter 136. The filter 140 filters the signal 116 to provide a signal 142 which is indicative of a more rapidly varying and substantially instantaneous relative rate of rotation between the rotor 102 and the housing 109. The signal 142, thus, includes the dynamic portion of the signal 130 which is indicative of a vehicle rollover condition.

A summer 144 subtracts the time-averaged rotation rate signal 138 from the more rapidly varying instantaneous rotation rate signal 142 to provide the rollover signal 135. The rollover signal 135 has a characteristic indicative of the instantaneous rate of rotation of the rotor 102 which, in turn, is indicative of a vehicle rollover condition. The filter circuit 134 thus removes the effects of initial relative rotation of the rotor, such as might occur due to vibration and/or friction. The filter circuit 134 also adds stability to the differentiated signal 130. The stabilization of the signal 130 also helps compensate for bifurcation of the light beam 120 that occurs when the light beam strikes a vertex between adjacent facets 108 of the rotor 102.

The rollover signal 135 is provided to a microcomputer 146, which is substantially identical to the microcomputer 44 described above. The microcomputer 146 also receives one or more signal(s) 148 from one or more other sensor(s) 150, also as described above. The microcomputer 146 is operative to control one more occupant protection device(s) 152 in response to the signals 135 and 148. In particular, the microcomputer 146 is programmed to determine the occurrence of a vehicle crash event, such as a vehicle rollover condition, and to provide a control signal 154 to the occupant protection device(s) 152. The control signal 154 controls actuation of the occupant protection device(s) 152 in response to the rollover signal 135.

Other types of optical as well as non-optically based sensors may, in accordance with the present invention, be utilized to sense relative rotation of the rotor 12, 102. For example, a photodetector may detect the amount of light being reflected by a rotor having variable reflective surface adjacent to an optical emitter. The variable reflective surface may, for example, include a varying gray scale embedded circumferentially along a surface of the rotor 12, 102. The variable reflective surface reflects an amount of light that varies according to the reflective index of the particular part of the surface that the light strikes, which is based on relative angular position of the rotor. The reflected light is detected at an appropriately configured detector.

Other examples of rotation sensing devices that may be used in accordance with the present invention include magnetic, electrostatic and/or acoustic sensors. Such sensors would be associated with the rotor 12, 102 in a manner similar to the optical systems 10, 100 described above. Each sensor would provide a signal that is acted upon to vary as a function of the relative rotation of the rotor. Such signals are filtered, such as described above, to remove a parameters from the sensor signal which are due to initial relative rotation of the rotor. The filter provides a signal, e.g., a rollover signal, indicative of a substantially instantaneous relative rate of rotation between the rotor and the housing. A suitable controller, which is responsive to the rollover signal, determines the occurrence of a vehicle rollover condition based on the rollover signal provided by the filter for controlling the associated occupant protection devices.

In each of the exemplary embodiments described above, a rollover condition is detected based upon a variable relative rotation rate between the rotor and the housing, which is independent of rotor position. Thus, no rest position of the rotor need exist for the rotor. This is because the rotor is inertially balanced for substantially free rotation about the rotor axis and the effects of initial relative rotation of the rotor are removed by appropriate filtering. Accordingly, the system enables efficient detection of a vehicle rollover condition and resistance movement of the vehicle not indicative of a vehicle rollover condition.

From the above description of the invention, those skilled in the art will perceive improvements, changes and modifications. For example, each the embodiments disclosed a single detector for detecting relative rotation of the rotor. Multiple detectors also may be used in accordance with the present invention. Such improvements, changes and modifications within the skill of the art are intended to be covered by the appended claims.

Having described the invention, the following is claimed:

1. A vehicle rollover sensor comprising:
   a rotor having a rotor axis and mountable within a vehicle, said rotor being inertially balanced and freely rotatable about the rotor axis, said rotor axis being fixed relative to the vehicle; and
   a detector for detecting rotation of said rotor about the rotor axis, said detector being operative to provide a detector signal indicative of a rate of relative rotation, whereby a vehicle rollover condition may be determined based on the detector signal.

2. A sensor as set forth in claim 1 further including a housing fixedly mounted within the vehicle, said rotor being located within said housing with the rotor axis extending in a direction of travel of the vehicle, inertia of said rotor resulting in relative rotation between said rotor and said housing during a vehicle rollover condition.

3. A sensor as set forth in claim 2 wherein said detector is fixed relative to said housing for detecting relative rotation between said rotor and said housing, said detector providing the detector signal indicative of a rate of relative rotation between said rotor and said housing about the rotor axis.

4. A sensor as set forth in claim 3 wherein said system further includes a filter connected with said detector, said filter being effective to remove a time-averaged component of the detector signal so as to provide a signal having a characteristic indicative of a vehicle rollover condition.

5. A sensor as set forth in claim 1 further including means for removing a portion of the detector signal corresponding to a time-averaged component of the detected relative rotation of said rotor and providing a rollover signal having a characteristic indicative of a vehicle rollover condition.

6. A sensor as set forth in claim 5 wherein said means for removing further includes a filter electrically connected with said detector and configured to pass a time-averaged low frequency portion of the detector signal, means for subtracting the time-averaged low frequency portion of the detector signal from at least a portion of the detector signal to provide the rollover signal.

7. A sensor as set forth in claim 5 further including a controller which is operative to determine the occurrence of a vehicle rollover condition in response to the rollover signal and to provide a control signal indicative thereof.

8. A vehicle rollover occupant protection system in combination with said sensor of claim 7, said combination including an actuatable occupant protection device electrically connected with said controller, said controller controlling actuation of said occupant protection device in response to the rollover signal.

9. A sensor as set forth in claim 1 wherein said sensor further includes a differentiator electrically connected to said detector, said differentiator outputting the detector signal indicative of the rate of relative rotation between said rotor and the rotor axis.

10. A sensor as set forth in claim 9 further including means for removing a portion of the detector signal corresponding to a time-averaged component of the detected relative rotation of said rotor and providing a signal corresponding to the remaining portion of the detector signal having a characteristic indicative of a vehicle rollover condition.

11. A sensor as set forth in claim 1 wherein said detector is a light detector for detecting light that varies as a function of the relative orientation between said rotor and the rotor axis, said light detector providing the detector signal.

12. A sensor as set forth in claim 11 further including means for removing a time-averaged portion of the detector signal and providing a rollover signal corresponding to the remaining portion of the detector signal, the rollover signal having a characteristic indicative of a vehicle rollover condition.

13. A sensor as set forth in claim 12 wherein said means for removing further includes a filter electrically connected with said light detector and configured to pass a time-averaged, low frequency component of the detector signal, the time-averaged, low frequency component of the detector signal being subtracted from at least a portion of the detector signal to provide the rollover signal.

14. A sensor as set forth in claim 13 wherein said filter includes a low pass filter having a first time constant which, in response to the detector signal, provides a first signal indicative of a time-averaged rate of relative rotation of said rotor about the rotor axis, the first signal being subtracted from at least a portion of the detector signal to provide the rollover signal having a characteristic indicative of a vehicle rollover condition.

15. A sensor as set forth in claim 14 further including a second low pass filter having a second time constant, which is less than the first time constant, said second low pass filter being electrically connected with said detector to, in response to the detector signal, pass at least a substantial portion of said detector signal and to provide a second signal indicative of a rate relative rotation of said rotor, the first signal being subtracted from the second signal to provide the rollover signal.

16. A vehicle rollover occupant protection system in combination with said sensor of claim 13, said combination including a controller for, in response to the rollover signal, determining an occurrence of a vehicle rollover condition, said controller providing a control signal in response to determining the occurrence of a vehicle rollover condition.

17. A sensor as set forth in claim 1 further including means for damping low frequency rotation of said rotor about the rotor axis.

18. The sensor as set forth in claim 1 wherein said detector includes a light source and a light detector, said light source and said light detector being fixed relative to said rotor axis, said rotor being interposed between said light source and said light detector and including a plurality of slots through which light may pass, one complete revolution of said rotor relative to said detector resulting in a plurality of pulses of light being detected by said detector.

19. The sensor as set forth in claim 18 wherein said detector, in response to detecting the plurality of pulses of light, is operative to provide the detector signal having a series of pulses indicative of the detected pulses of light.

20. The sensor as set forth in claim 19 further including means for receiving the detector signal having the series of pulses and means for processing the series of pulses to determine the rate of relative rotation.

* * * * *